May 17, 1932.  L. F. NENNINGER  1,859,242
TRANSMISSION AND CONTROL MECHANISM
Filed July 19, 1930   2 Sheets-Sheet 1
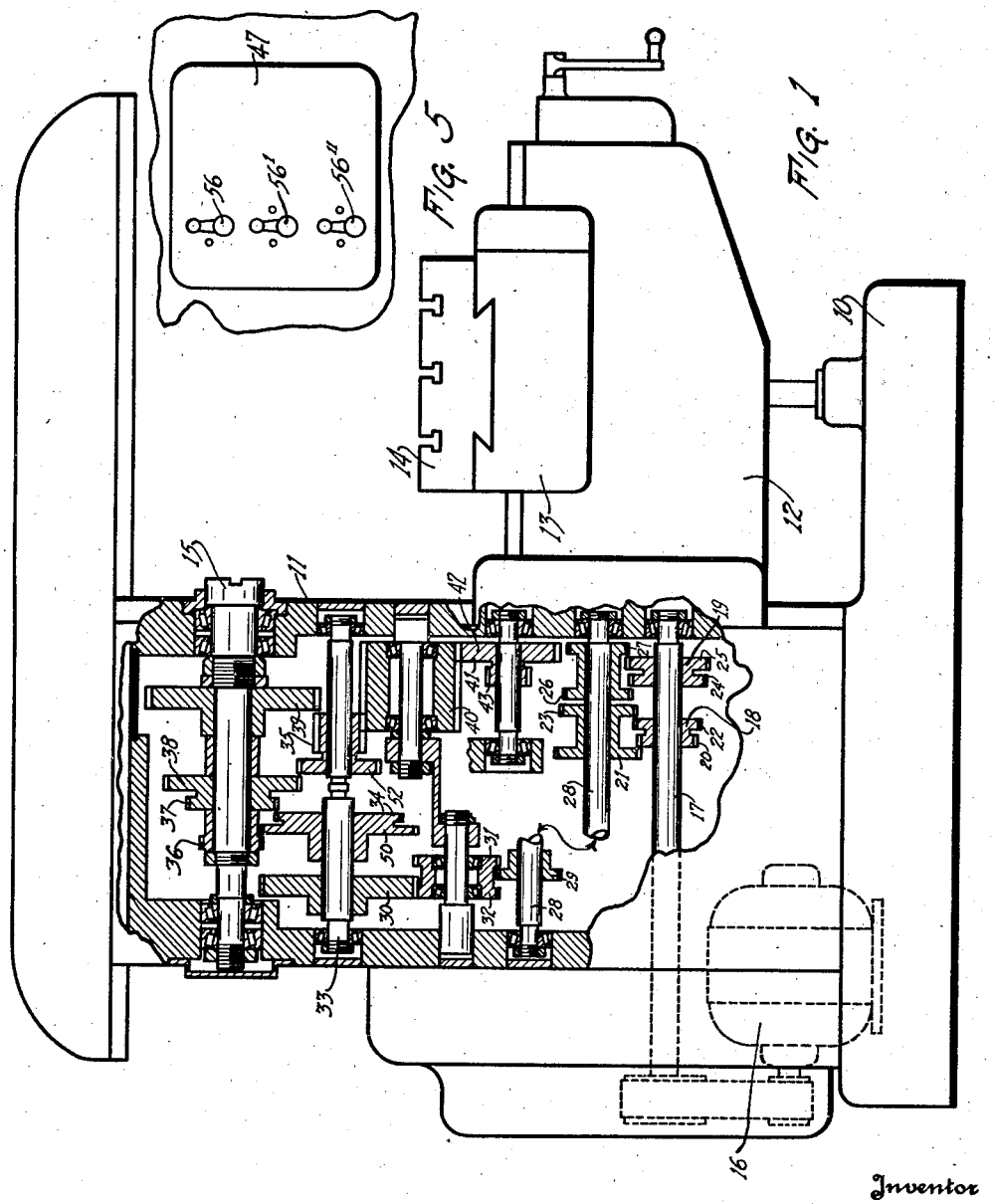
Inventor
LESTER F. NENNINGER
By A. H. K. Parsons
Attorney

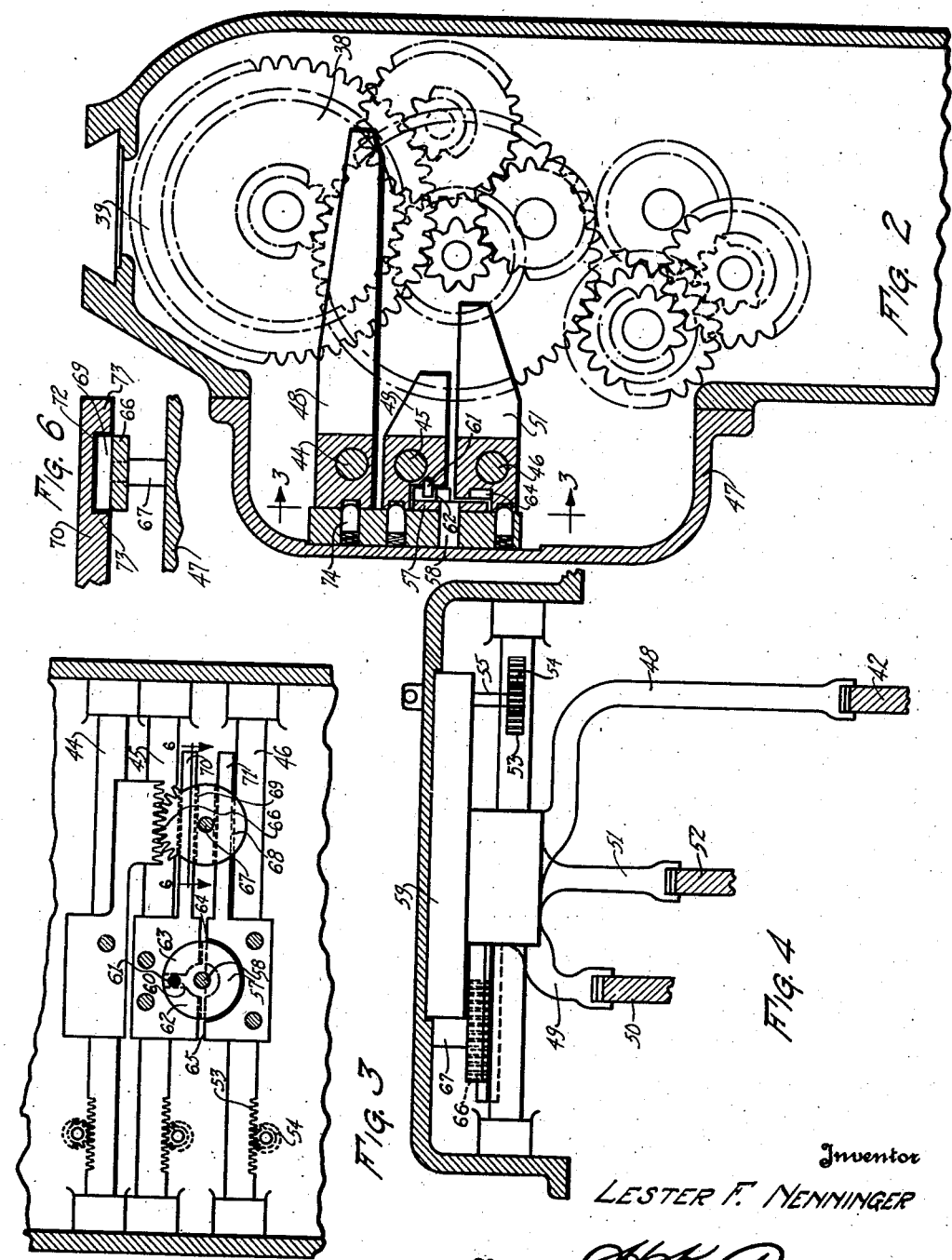

Patented May 17, 1932

1,859,242

UNITED STATES PATENT OFFICE

LESTER F. NENNINGER, OF CINCINNATI, OHIO, ASSIGNOR TO THE CINCINNATI MILLING MACHINE COMPANY, OF CINCINNATI, OHIO, A CORPORATION OF OHIO

TRANSMISSION AND CONTROL MECHANISM

Application filed July 19, 1930. Serial No. 469,071.

This invention relates to milling machines and more particularly to a transmission and control mechanism therefor.

One of the principal objects of this invention is the provision of an improved transmission suitable for general machine tool use which will offer an efficient and economical selection of speeds and torques.

A further object of this invention is to provide a variable speed transmission from which a wide range of speeds may be obtained through a minimum number of gear contacts for each speed thereby permitting the transmission of a maximum amount of power for each speed.

A still further object of this invention is to provide interlocking means for three sets of back gears whereby only one set may be in power transmitting position at a time.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 1 is an elevation of a machine tool showing an expanded view of the transmission embodied therein.

Figure 2 is a view taken substantially on the line 2—2 of Figure 1.

Figure 3 is a section on the line 3—3 of Figure 2.

Figure 4 is a detail of the shifter rods and operating mechanism therefor.

Figure 5 is a detail view of the control levers.

Figure 6 is a section on the line 6—6 of Figure 3.

The economical requirements of a variable speed transmission suitable for machine tool use demand that the maximum amount of power for each speed be delivered to the actuated part from the prime mover, or in other words, that the loss of power in the transmission due to friction and other causes should be maintained at a minimum. One of the major sources of friction losses in variable speed transmissions is the large number of gear contacts necessary to the transmission of a given speed, from which it is seen that the smaller the number of gears utilized to effect an increase or decrease of speed from one part to another the more efficient the transmission will be.

A variable speed transmission for use in machine tools should also have a suitable speed range in order that the proper rate of relative movement as between the tool and work for instance, may be selected to effect stock removal in a reasonable time with due regard to the character and amount of material to be removed as well as the type of cutting tool utilized and the finish desired.

In some machine tools and more particularly in milling machines having a rotating cutter spindle, a transmission is needed that is capable in addition to transmitting a plurality of speeds to the cutter spindle, of imparting various torques thereto, to meet the varying demands placed upon the cutting tools. These demands vary with the type of cutter and size of cut, some cutters requiring a low speed and high torque, while other types having high speed cutting tips capable of withstanding relatively great heat require an extremely high speed and small torque in order to efficiently utilize them.

In many instances a suitable torque may be available in the final member, but due to the relationship of the diameter of the cutter to the diameter of the final gear which drives it, a mechanical advantage is lost which results in an inefficient drive. An efficient transmission should therefore, have in addition to a suitable range of speeds and torques, final members which are capable of maintaining a mechanical advantage over the parts to be driven thereby.

From the foregoing desiderata it should be apparent that a transmission in order to be satisfactory for general machine tool use must be highly flexible, capable of high speeds, variable to obtain low speeds with great power, and having final members in the various speed trains which bear suitable relationship to the size of the parts which may be actuated thereby.

In order to more fully understand the invention, reference may be had to the accompanying drawings, in which is shown a transmission which satisfies the above requirements and is capable of delivering suitable speeds and torques to meet the diversified requirements of modern machine tools and which has the necessary attributes suitable to its application to such highly developed precision tools, as milling machines, and capable of satisfactorily fulfilling the various demands made upon the transmissions of such machines.

In the drawings, Figure 1 shows the application of the transmission of this invention to a machine tool, in the present instance a milling machine, which has a base 10 and a column 11 upon which is mounted a work support organization comprising a knee 12 which supports a saddle 13 upon which is mounted a work table 14. A tool spindle, such as 15, is journaled in the upper part of the column. The transmission herein disclosed is coupled with the tool spindle 15 for actuation thereof and is to be considered as an illustration of one application of the transmission since it is readily apparent to those skilled in the art that the transmission is equally adaptable for effecting movement of other elements, such as the work supporting members.

The prime mover, such as 16, mounted in the base of the machine may be used to operate the primary shaft 17 of the variable speed transmission which has the shiftable gear couplets 18 and 19 mounted thereon. The couplet 18 includes the gear 20 shiftable into mesh with the gear 21 and the gear 22 shiftable into mesh with the gear 23. The gear couplet 19 comprises the gears 24 and 25 shiftable respectively into engagement with the gears 26 and 27. The driven gears are fixed to shaft 28 which is journaled in a fixed part of the machine parallel to the shaft 17. Any suitable known means may be used for shifting the gear couplets to effect the four different rates of speed in the driven shaft 28. Slidably mounted on the end of shaft 28 is the gear 29 adapted to be shifted to the left to mesh directly with gear 30 or to the right to mesh with gear 31. The latter, together with the gear 32, constitutes a reversing mechanism whereby the gear 30 may be driven in either direction from the gear 29.

The gear 30 is fixed on the end of a shaft 33 which has a plurality of back gear units splined thereon. In the present instance these units are shown closely coupled with the gear although it may be necessary or more desirable in other types of installation to extend the shaft 30 thereby having the variable speed transmission at a more convenient location and the back gear units remote therefrom adjacent the part to be driven thereby. The units 34 and 35 are splined on the shaft 33 and adapted to mesh with either one of a plurality of back gears keyed to the cutter spindle. The back gear couplet 34 is shiftable to the left to engage gear 36 and to the right to engage gear 37, while the gear couplet 35 is shiftable to the left to engage gear 38 or to the right to engage gear 39. The gear couplet 35 includes the pinion member 39 which is in constant engagement with the elongated pinion 40 which in turn actuates the couplet 41 through the gear 42. The smaller gear 43 of this couplet is adapted to be shifted to the left into driving engagement with the gear 39. From the description it should now be apparent that the spindle 15 is adapted to be driven from the shaft 33 through any one of five different back gear ratios, which in combination with the variable speed transmission results in twenty speeds being available to select from.

In many sixteen speed transmissions, the final member is driven through a single shiftable gear couplet which means that each gear transmits eight different speeds of revolution and, therefore, has eight different peripheral velocities. Since it is desirable to rotate all gears at an efficient peripheral velocity, such as 800 feet per minute, it is evident that in the transmission of such a wide range of speeds through a single gear that the peripheral velocities at certain speeds would be unsatisfactory. This difficulty has been overcome in the present invention by arranging the mechanism so that only four different rotational rates are transmitted through a single gear thus making it possible to choose gear sizes which will produce satisfactory peripheral velocities for all speeds. This arrangement also reduces the number of gear contacts for each speed thereby reducing frictional losses and increasing the power transmitted.

The back gear pairs are divided, as previously described, into three shiftable units and means have been provided for shifting any one of these units into power transmitting position, and simultaneously locking the other units in neutral to insure against the simultaneous engagement of two gear pairs with resultant breakage of parts. To this end shifter rods, such as 44, 45 and 46 are slidably mounted in a bracket 47 attached to the side of the column and provided with a shifter arm fixed therewith. The rod 44 has integrally connected therewith shifter arm 48 which engages the sides of the gear 42. The shifter rod 45 has the bifurcated arm 49 which engages the gear 50 of the couplet 34 and the shifter rod 46 has the arm 51 with a forked end which engages the gear 52. Each of the rods 44, 45 and 46 is provided with a rack portion, such as 53, and a pinion gear 54 mounted on the end of a shaft 55 is provided to mesh with each rack portion. Rotation of any pinion will cause subsequent shifting of its respective arm. The shafts 55 are provided on their exterior extremities with handles 56 for the manual actuation thereof.

In order to prevent the actuation of more than one shifter rod at a time, interlocking means have been provided between the three shiftable units. This is accomplished by providing an interlock between shifter rod 45 and the shifter rod 46 whereby movement of one to a power transmitting position will prevent movement of the other, which may take the form of a pivoted disk 57 mounted on the end of the pin 58 journaled in the block 59 fixed to the bracket 47. This disk has two arcuate shaped lugs 62 and 63 projecting therefrom and situated adjacent to one another to form a radial slot 60. A pin 61 is fixed to the rear face of the shifter arm 49 to engage the slot. The opposite ends of the lugs lie in a diametrical line which is parallel to the upper face of the shifter arm 51. The rear face of the shifter arm is provided with an arcuate groove 64 into which either lug 62 or 63 is adapted to move upon reciprocation of the shifter arm 45 to thereby prevent movement of the arm 46. If the parts are in the position as shown in Figure 3, movement of the shifter arm 46 to the left or right will move the portion 64 or 65 of the upper face of the arm 51 into the path of movement of the lug 62 or 63 respectively, thereby preventing movement of the shifter arm 45. It is thus seen that an interlock has been provided between the arms 45 and 46. A further interlock has been provided between the arm 44 and the pair of arms 45 and 46 whereby upon movement of either arm 45 or 46 to a power transmitting position, movement of the arm 44 will be prevented or if the arm 44 has been moved to a power transmitting position shifting of either arm 45 or 46 will be prevented. To this end a mutilated gear, such as 66, is pivoted to the end of a stud shaft 67 and provided upon one face with a pair of parallel chordal grooves 68 and 69. Each arm 49 and 51 is provided with locking members 70 and 71 respectively. As shown in Figure 6, when the parts are in neutral position the recess 72 formed in each arm is in such a position as to permit rotation of the gear, while upon movement of either the arm 70 or the arm 71 a projecting portion, such as 73, will enter a chordal groove and prevent rotation of the gear and thereby prevent shifting of arm 48. Or if the gear 66 is rotated from neutral position by movement of arm 44, the grooves 68 and 69 will be moved out of register with the portions 73 and thereby prevent movement of either arm 45 or 46. Detent means have been provided, such as the spring pressed plungers 74, for maintaining the parts in adjusted position.

It should now be apparent that a transmission has been provided adapted for general application to a machine tool, where variations in the range of movement of a part is desired, in which is combined a variable speed transmission and a plurality of back gear sets for use in conjunction therewith to increase the range of the variable speed transmission and of control mechanism for the back gear sets having interlocking means to prevent the use of more than one at a time.

That which is claimed is:

1. A transmission and control mechanism for a machine tool comprising a variable speed transmission, a series of back gear multipliers and a final member in serial power transmitting relationship, a reverser interposed between the back gears and transmission, said back gears including five shiftable gears and means to selectively move any one of them into power transmitting position between the reverser and said member.

2. A transmission and control mechanism for a machine tool comprising a variable speed transmission, a reverser and a plurality of back gear units, all of said parts being mounted in serial power transmitting relation, a pair of control members each connected to a separate back gear unit, and a single control member connected to another back gear unit, and interlocking means to prevent the movement of more than one control member at a time.

3. A transmission and control mechanism for a machine tool comprising a variable speed actuator, a final driven member, three sets of shiftable speed changing units mounted in interposed relation between said actuator and the driven member, individual control means for each of said shiftable units and a triple interlock to prevent the movement of more than one unit at a time.

4. A transmission and control mechanism for a machine tool comprising a variable speed actuator, a member to be driven therefrom, an intermediate shaft adapted to be driven in a forward or a reverse direction by said actuator, a plurality of gears on said driven member, a pair of shiftable gear couplets on said intermediate shaft, means to shift said couplets to any one of four different power transmitting positions, an idler gear in constant mesh with one of said shiftable gears, and an additional shiftable gear interposed between said idler and said driven member, and means to shift said gear into mesh with a gear on said driven member to effect an additional speed ratio between the shaft and member.

5. A transmission and control mechanism for a machine tool comprising a variable speed actuator, a final driven member, a first, second and third shiftable unit interposable between said actuator and final member for the transmission of power from one to the other, individual means for shifting the first and second units, an interlock between said means to permit actuation of only one at a time, means to shift the third unit and interlock means between said third shifting means and the first pair of shifting means to prevent actuation of said third means when either one of said first two means have been moved to a power transmitting position.

6. A transmission and control mechanism for a machine tool comprising a driving member, a driven member, an intermediate shaft, means to actuate said shaft from the driving member in a forward or reverse direction, a plurality of shiftable power transmitting elements actuated by said intermediate shaft comprising a pair of shiftable gear couplets and a single shiftable gear, individual arms for shifting said couplets and said gear, an interlock to prevent the actuation of more than one at a time, including a rotatable disk, means on one shifter arm upon movement to a power transmitting position to rotate said disk to a position preventing movement of a second arm, and additional means actuated thereby for preventing movement of a third arm.

7. A transmission and control mechanism for a machine tool including a driving member, a driven member, and three shiftable units interposable therebetween for the transmission of a plurality of speeds from one to the other, individual shifter rods for each of said units, interlock means between a pair of said shifter rods to permit movement of only one at a time, additional interlock means between said pair and the third shifter rod to prevent actuation thereof when either of the first pair is in power transmitting position, including a rotatable member having a gear segment on its periphery and a pair of parallel chordal grooves on one face thereof, a rack arm integral with said third shifter engaging said gear segment, individual arms integral with the first pair of shifters and extending parallel to one another and in overlying relation with said grooves, said arms having projections for engaging said grooves upon movement of either to a power transmitting position to prevent rotation of the circular member, and thereby movement of the third shifter rod.

8. A transmission for a machine tool comprising a change speed transmission, a reverser, a driven shaft actuable at various speeds and in opposite directions by said transmission through the reverser in serial power transmitting relationship, an ultimate driven member having a first and second gear thereon, a gear couplet on the driven shaft shiftable to mesh one gear thereof with said first gear and the other gear thereof with said second gear to effect coupling of the driven shaft to the driven member in two different speed ratios, and means interposable between said second gear and its corresponding mating gear of the couplet for connecting the shaft to the member in an additional speed ratio comprising a pinion constantly meshing with said mating gear, a shiftable couplet having a gear meshing with the pinion for constant rotation thereby, and means to shift the last named couplet to mesh the other gear thereof with said second gear on the member.

9. A variable speed transmission having in combination a driven shaft, power means for actuating said shaft at a plurality of speeds and in opposite directions, a final member, a pair of differently sized gears spaced on the member, a shiftable gear couplet mounted on the driven shaft between said gears for movement in opposite directions into mesh therewith to connect the shaft in different speed ratios with said member, said couplet having a neutral position, means for operatively connecting a gear of said couplet with its corresponding mating gear on the member to effect an additional speed ratio between the parts when said couplet is in a neutral position comprising a wide faced pinion in constant mesh with the gear of said couplet and a pair of gears mounted on a shaft parallel to the pinion, one of which is in constant engagement therewith and the other shiftable into mesh with said mating gear on the member whereby the shaft may be coupled to the member through said mating gear in two different speed ratios.

In testimony whereof I affix my signature.

LESTER F. NENNINGER.